United States Patent
Downs et al.

[11] Patent Number: 5,688,107
[45] Date of Patent: Nov. 18, 1997

[54] TURBINE BLADE PASSIVE CLEARANCE CONTROL

[75] Inventors: James P. Downs, Jupiter; Ronald C. Haigh, Stuart, both of Fla.

[73] Assignee: United Technologies Corp., Hartford, Conn.

[21] Appl. No.: 998,000

[22] Filed: Dec. 28, 1992

[51] Int. Cl.$^6$ .................... F01D 5/18; F01D 5/20
[52] U.S. Cl. .................... 416/97 R; 416/228; 416/237; 415/173.1
[58] Field of Search .............. 416/92, 91, 97 R, 416/90 R, 97 A, 228, 235, 237; 415/115, 173.1

[56] References Cited

U.S. PATENT DOCUMENTS

| | | | |
|---|---|---|---|
| 3,427,001 | 2/1969 | Molley et al. | 416/92 |
| 4,390,320 | 6/1983 | Eiswerth | 416/97 R |
| 4,540,339 | 9/1985 | Horvath | 416/92 |
| 4,589,823 | 5/1986 | Koffel | 416/92 |
| 4,604,031 | 8/1986 | Moss et al. | 416/92 |
| 4,863,348 | 9/1989 | Weinhold | 416/92 |
| 4,893,987 | 1/1990 | Lee et al. | 416/92 |
| 4,940,388 | 7/1990 | Lilleker et al. | 416/97 R |
| 4,992,026 | 2/1991 | Ohtomo et al. | 416/97 R |
| 5,062,768 | 11/1991 | Marriage | 416/97 R |
| 5,183,385 | 2/1993 | Lee et al. | 416/97 R |
| 5,282,721 | 2/1994 | Kildea | 416/97 R |

FOREIGN PATENT DOCUMENTS

| | | | |
|---|---|---|---|
| 2405050 | 8/1975 | Germany | 416/92 |
| 135606 | 7/1985 | Japan | 416/97 R |
| 710938 | 6/1954 | United Kingdom | 416/237 |

Primary Examiner—Michael J. Carone
Assistant Examiner—Theresa M. Wesson
Attorney, Agent, or Firm—Norman Friedland

[57] ABSTRACT

Intersecting judiciously located installed holes at the tip section of the airfoil of an internally cooled axial flow turbine blade for a gas turbine engine communicating with a passage adjacent the pressure side and another passage adjacent the suction side of the airfoil provide a resultant flow that creates an aerodynamic seal that opposes the flow of engine working medium leaking into the clearance between the tip of the airfoil and the surrounding annular shroud or outer air seal. The installed holes are in proximity to the intersection of the tip surface with the airfoil pressure side surface.

4 Claims, 3 Drawing Sheets

TURBINE BLADE PASSIVE CLEARANCE CONTROL

TECHNICAL FIELD

This invention relates to internally cooled turbine blades for gas turbine engines and particularly to means for utilizing the discharging cooling air from the blades to effectuate passive clearance control.

BACKGROUND ART

As is well known in the gas turbine engine field of technology a great effort has been devoted to improve engine operating performance by attempting to hold the clearance of the gap between the outer air seal and the tip of the turbine blade at a minimum during the full range of the engine's operating envelope. What has developed over the years is a host of inventions and concepts that have through active and passive clearance controls attempted to achieve this end. To some degree, many of these inventions and concepts have proven to be successful, but owing to the increasing demands on engine and aircraft performance, the problem has become increasingly more difficult. The solution to the problem is also predicated on the type of aircraft/engine being designed and to its particular mission. What may be satisfactory for say, aircraft used by commercial airlines is often not satisfactory for military aircraft, particularly those designed to be in the fighter class.

For example, in engines designed for use in aircraft used for commercial applications, such as those used in revenue service, the active clearance controls have been proven to be fairly successful. An example of an active clearance control that has met considerable commercial success is exemplified in U.S. Pat. No. 4,069,662 granted to Redinger et al on Jan. 24, 1979 and assigned to the assignee common with this patent application. This type of control judiciously impinges air on the engine's outer case in proximity to the turbine rotor in order to shrink the case at predetermined times during its operating envelope and hence, position the outer air seal closer to the tips of the turbine or compressor blades so as to reduce the gap.

In contrast to the active clearance control design philosophy, the passive clearance control utilizes a continuous means to effectuate the control of these clearances. For example, one such system continuously impinges cooling air on the outer engine case in proximity to the rotor blades to limit the rate of expansion of the outer case subjected to elevated temperatures in order to hold clearances to a minimum. In short the "active" type of control requires a control system that responds to an input and applies hot or cold air or mechanical means in order to effectuate control of the clearances. The "passive" type of clearance control doesn't require a control system and is in a quiescent state at all times.

This invention contemplates a passive type of clearance control that utilizes the discharge air used for internally cooling of the turbine blades for controlling the effective clearances between the tip of the turbine blade and the outer air seal. This invention discloses means for imposing an aerodynamic seal in the gap between the outer air seal and tips of the blades so as to minimize flow therein and hence, reduce the flow from the high pressure side of blade to the low pressure side thereby increasing the efficiency of the turbine. Essentially, this invention consists of two holes installed into the tip of the turbine blade near the intersection of the tip surface with the airfoil pressure side surface. One of the holes communicates with the internal coolant passage adjacent the pressure side and the other hole communicates with the internal coolant passage adjacent the suction side. The holes intersect to affect the velocity (momentum) and angle of the spent cooling air discharging from the slot formed from the two installed holes. Heretofore, cooling flow discharging from cooling passages adjacent the pressure and suction side of the airfoil section of the blade were ejected from independent holes. Because of the constraints on spacing of these independent holes and the limitations placed on the angles of the holes that intersected the cooling passage adjacent the pressure side, any meaningful aerodynamic tip sealing capabilities was precluded in these heretofore known designs. While intersecting holes in air cooled turbine blades are known in the art, the use of the discharging cooling air as disclosed by the present invention utilizes the intersecting holes for a purposes entirely different from that shown in the prior art. For example, U.S. Pat. No. 4,540,339 granted to Horvath on Sep. 10, 1985 and 5,062,768 granted to Marriage on Nov. 5, 1991 each disclose intersecting holes located at the tip of the turbine blade. In one instance, the flow egressing from these discharge holes serves to scrub the side wall surfaces of the squealer tip cap and in the other instance the intersecting holes decrease the likelihood of contamination and hole blockage.

DISCLOSURE OF INVENTION

An object of this invention is to provide for an axial flow gas turbine engine having axial flow turbine blades including an outer air seal improved means for obtaining passive clearance control.

A feature of this invention is to provide in internally cooled axial flow turbine blades intersecting passages communicating with internal passages on the suction and pressure sides of the blade located at the tip of the blade adjacent the pressure side for effectuating aerodynamic tip sealing (passive clearance control) by judiciously controlling the momentum and direction of the discharging stream of the discharging cooling air.

The foregoing and other features of the present invention will become more apparent from the following description and accompanying drawings.

BEST MODE FOR CARRYING OUT THE INVENTION

As will be appreciated by one skilled in this art the turbine blade is one of a plurality of axial flow turbine blades supported in a disk of the turbine rotor and is driven by the hot gases developed in the combustion section of the gas turbine engine. Essentially, the energy extracted by the turbine serves to drive the compressors of the engine and produce thrust. Because the turbine closest to the combustion section (referred to in the industry as the first stage turbine) sees perhaps the highest temperature of all the components of the engine, means are employed to cool the turbine rotor and particularly its blades. Turbine blade cooling is well known and for the purposes of understanding this invention it is only necessary to understand that in most turbine blade cooling schemes there is typically included an internal longitudinal passageway closest to the pressure side of the blade and another closest to the suction side of the blade. An example of this construction is disclosed in U.S. Pat. No. 4,604,031 granted to Moss et al on Aug. 5, 1986 which is incorporated herein by reference. As noted in this patent the passages connected to the pressure side and suction side include independent discharge ports that inject flow into the gap defined by the outer air seal and the tips of the blades.

Figure 1:
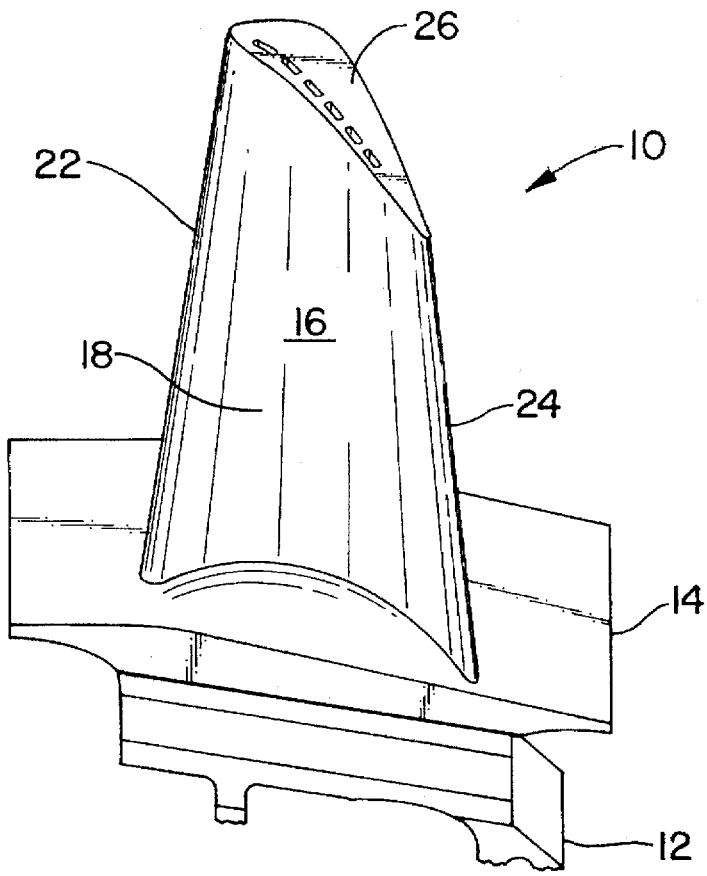
FIG. 1 is a perspective view of a turbine blade for gas turbine engines.

A better understanding of this invention may be had by referring to FIGS. 1-4 that show a turbine blade typically used in a turbine rotor. The perspective view of FIG. 1 shows the details of a single turbine blade generally indicated by reference numeral 10 as having a root section 12, a platform 14 and an airfoil section 16. In this view the pressure side 18 of the blade is in view and the suction side 20 is on the opposite face not in view. The blade also consists of the leading edge 22 and trailing edge 24 and tip section 26. Looking at the tip 26 in FIG. 2, the slots 28 formed by the drilled intersecting hole to be presently described are located in proximity or closest to the pressure side of the blade.

Figure 2:
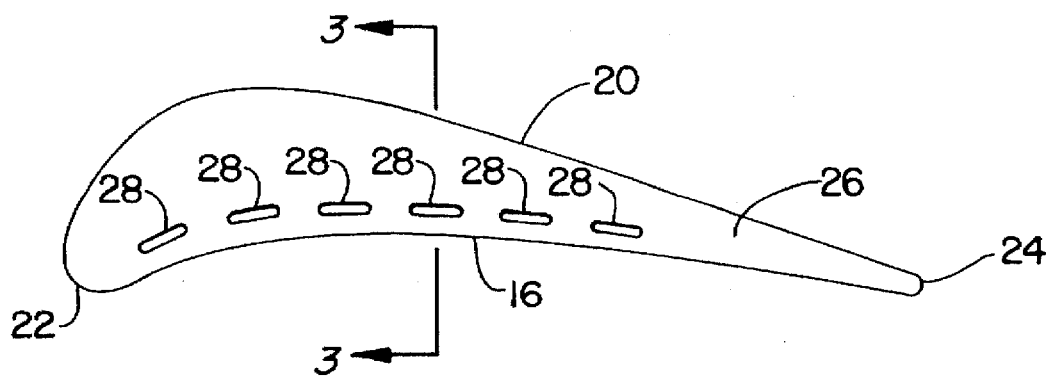
FIG. 2 is a top plan view of the turbine blade depicted in FIG. 1.
Figure 3:
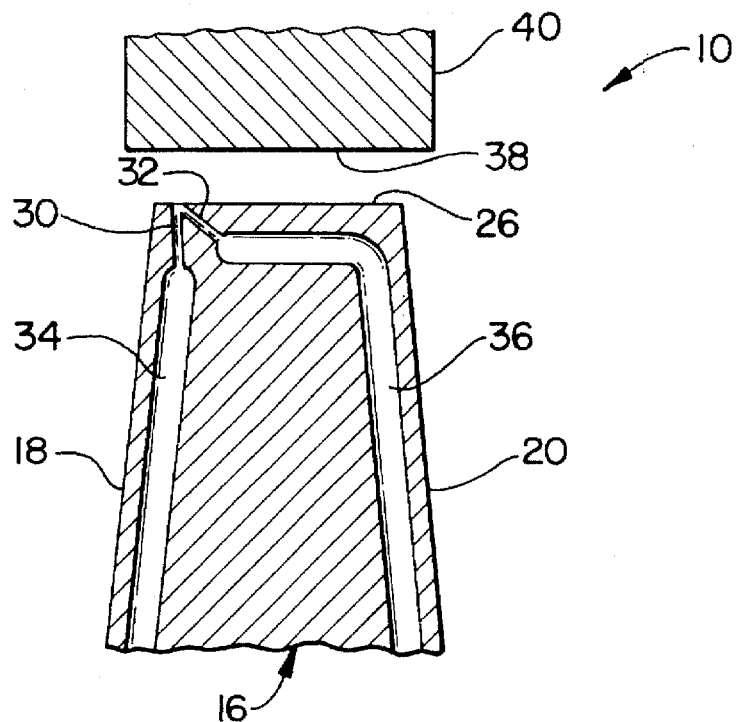
FIG. 3 is a partial sectional view taken along line 3—3 of FIG. 2 and including a portion of the outer air seal.
Figure 4:
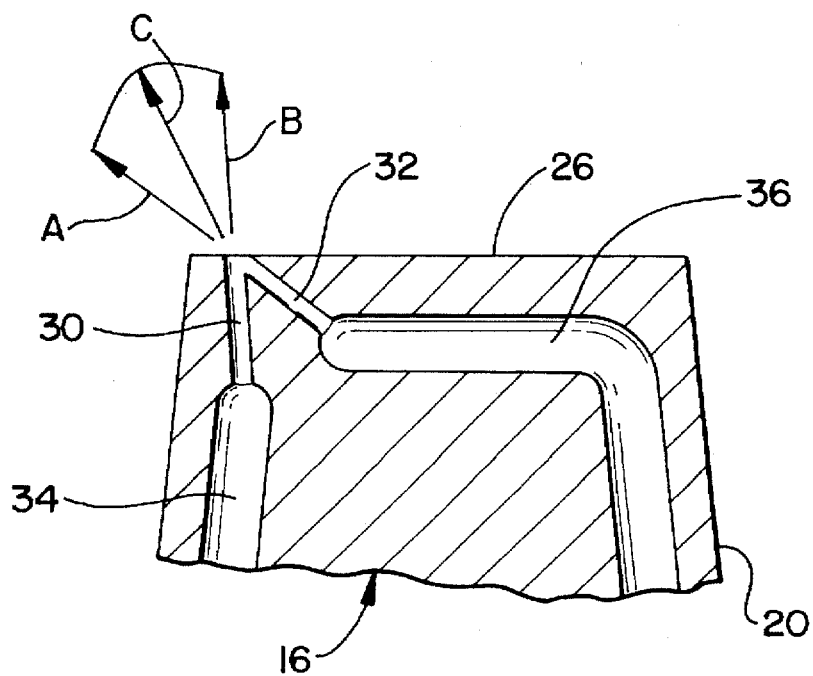
FIG. 4 is an exploded view of FIG. 3 illustrating a vectorial diagram of the flow streams discharging through one of the discharge ports shown in FIGS. 1 and 2.
Figure 5:
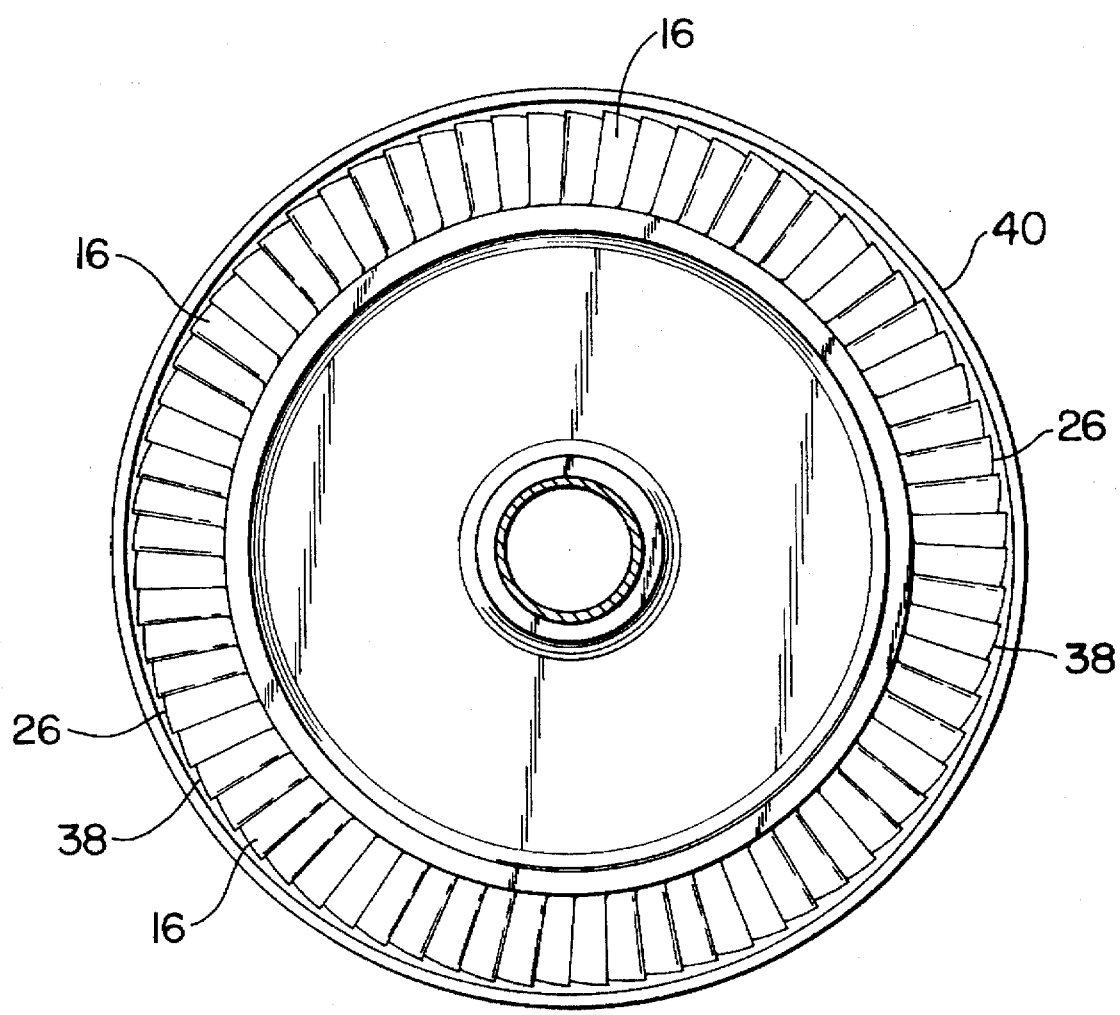
FIG. 5 is a front view in elevation of the turbine and outer air seal or shroud.

The intersecting installed holes 30 and 32 viewed from a section taken through line 3—3 of FIG. 2 and as best seen in FIGS. 3 and 4 interconnect internal cast passageways 34 and 36, respectively. As noted from these FIGS, the installed hole 30 is positioned in the tip at a slight angle relative to the tip surface normal to the blade's center line so as to be in communication with passageway 34 adjacent the pressure side of the airfoil. Hole 32 is installed at a shallow angle relative to the tip surface so as to communicate with passageway 36 adjacent the suction side of the airfoil.

The angles and location of holes 30 and 32 are judiciously selected to provide critical characteristics of the cooling air discharging from slot 28. As best seen in FIG. 4, the angle of these holes and the momentum of the cooling air discharging therefrom effectuate a resultant vector force that injects the stream of fluid in the gap between the tip 26 and inner annular surface 38 of the outer airseal 40, partially shown. Arrow A depicts the vector of the velocity and direction of the flow egressing from passage 36 and Arrow B depicts the vector of the velocity and direction of the flow egressing from passage 34. The resultant direction and velocity depicted as arrow C from this vector diagram is in a direction that is toward the pressure side of the airfoil, thus, providing an aerodynamic seal in the gap.

As is apparent from the foregoing, the engine working medium (gas path) is discouraged from flowing into this gap but rather is forced to flow between the working surfaces of the airfoil, which enhances the efficiency of the turbine.

Although this invention has been shown and described with respect to detailed embodiments thereof, it will be appreciated and understood by those skilled in the art that various changes in form and detail thereof may be made without departing from the spirit and scope of the claimed invention.

What is claimed:

1. An internally air cooled airfoil of a turbine blade used in a gas turbine engine having internal passageway adjacent the pressure side of the airfoil and independent internal passageway adjacent the suction side of said airfoil, said airfoil having a tip section, an annular shroud surrounding said tip section and defining therewith a gap that changes its radial dimension resulting from the radial positioning of said annular shroud and said tip section relative to each other, the improvement comprising:

means for obtaining a momentum flow stream in opposition to the flow of engine fluid medium flowing through said gap, said means including at least a pair of intersecting installed passages formed into the tip of said airfoil in proximity to the intersection of the tip surface with the pressure side of said airfoil for discharging air from said internally cooled airfoil, whereby the resultant flow resulting from the momentum and direction of the flow occasioned by the velocity and direction of the flow discharging through said intersecting installed holes provides an aerodynamic seal in said gap to minimize the leakage of engine working medium flowing over the working surfaces of said airfoil.

2. An internally air cooled airfoil as claimed in claim 1 wherein one of said pair of installed passages communicates with an internally cooled passageway formed adjacent the pressure side of said airfoil and the other of said pair of installed holes communicates with an internally cooled passageway formed adjacent the suction side of said airfoil.

3. An internally cooled airfoil as claimed in claim 2 wherein said airfoil includes a leading edge and a trailing edge, said means having a slot at the tip section generally parallel to the surface of the airfoil on the pressure side and extending in a direction from the leading edge to the trailing edge.

4. An internally cooled airfoil as claimed in claim 2 wherein said airfoil includes a leading edge and a trailing edge, and said means includes a plurality of slots spaced between said leading edge and said trailing edge adjacent to said pressure side of said airfoil.

\* \* \* \* \*